EMILE PREVOST.
Improvement in Galvanic Batteries.

No. 119,175. Patented Sep. 19, 1871.

Witnesses:
C. Wahlers
Ernst Bilhuber

Inventor:
Emile Prevost
pr
Van Santvoord & Hauff
atty

UNITED STATES PATENT OFFICE.

EMILE PREVOST, OF NEW YORK, N. Y.

IMPROVEMENT IN GALVANIC BATTERIES.

Specification forming part of Letters Patent No. 119,175, dated September 19, 1871.

*To all whom it may concern:*

Be it known that I, EMILE PREVOST, of the city, county, and State of New York, have invented a new and useful Improvement in Galvanic Batteries; and I do hereby declare the following to be a full, clear, and exact description thereof, which will enable those skilled in the art to make and use the same, reference being had to the accompanying drawing forming part of this specification, in which drawing—

Figure 1:
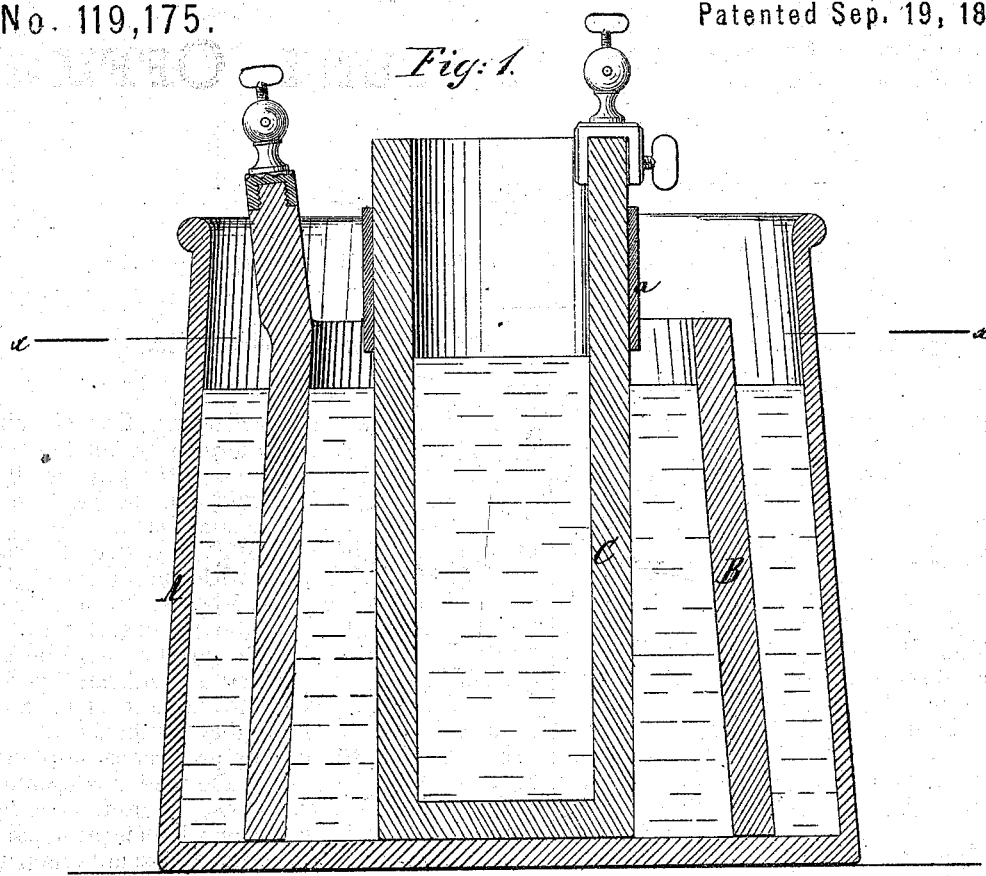
Figure 2:
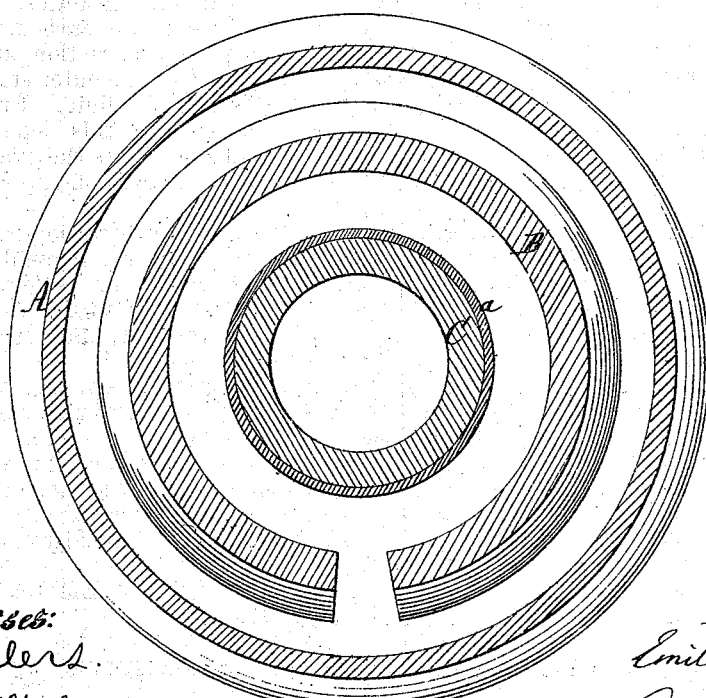

Figure 1 represents a vertical central section of this invention. Fig. 2 is a horizontal section of the same, the line $x\,x$ in Fig. 1 indicating the plane of section.

Similar letters indicate corresponding parts.

This invention relates to an electric battery the zinc element of which is made conical, while the carbon element is made in the form of a cylindrical cup closed at the bottom and provided at or near its top with a ring or collar of gutta-percha or India rubber in such a manner that, by the conical form of the zinc element, the effect of the exciting liquid in the vase is materially increased; and by the gutta-percha or India-rubber collar on the cup-shaped carbon element the evaporation of the exciting liquid contained in said cup is counteracted, and said carbon element is protected against injury from coming in contact with the edge or corner of the zinc element; and it is also insulated from the zinc element if it should be brought in an oblique or eccentric position; and, furthermore, the carbon-cup takes the place of the porous vessel and ordinary carbon element.

In the drawing, A designates a vase of glazed earthenware, porcelain, or other suitable material, in which is placed the zinc element B. This element, instead of being made cylindrical, as usual, is made in the form of an annular truncated cone, as shown in Fig. 1, and it incloses the carbon element C, which is cylindrical, closed at the bottom and open at the top, thus forming a substitute for the porous cup, and combining in one piece the ordinary carbon element and the porous cup ordinarily used in galvanic batteries. On the carbon-cup, at or near its top, is placed a collar, *a*, of India rubber or gutta-percha, which serves to insulate the carbon-cup from the zinc element, and which also forms a protection, preventing the carbon-cup from getting injured if it should be thrown or thrust against the edge of the zinc element. If the zinc element was made cylindrical it would be difficult to keep the carbon-cup free from contact with zinc, for the slightest displacement of said carbon-cup would throw its unprotected bottom edge in contact with the zinc and the effect of the battery would be impaired. Besides this, I have found that by giving to the zinc element the shape of a truncated cone the effect of the battery is increased.

In the vase A I use by preference sulphuric acid diluted with water to about $2°$ or $3°$ Baumé, and in the carbon-cup I use by preference the new galvanic-fluid of Barjon, which is principally composed of chromic acid with a small quantity of sulphuric acid and lime, and which supersedes the nitric acid generally used in the porous cups of ordinary galvanic-batteries. The galvanic-fluid which I use in my carbon-cup rises in the carbon by capillary attraction, and a deposit of crystals is formed on the outer surface of the cup above the level of the fluid. But by the application of the collar *a* this deposit is avoided, since said collar prevents the evaporation of the liquid raised in the carbon-cup by capillary attraction.

It is obvious that my carbon-cup may be made with a square, oval, or polygonal cross-section; but I prefer to make the same with a circular cross-section, as shown in Fig. 2 of the drawing.

What I claim as new, and desire to secure by Letters Patent, is—

1. In a galvanic battery, the combination of a carbon-cup with a conical zinc element, substantially as set forth.

2. The collar *a*, at or near the top of the carbon-cup C and opposite the top edge of the conical zinc element B, substantially as described.

This specification signed by me this 6th day of July, 1871.

EMILE PREVOST.

Witnesses:
W. HAUFF,
E. F. KASTENHUBER.                (31.)